United States Patent [19]

Schirtzinger

[11] 3,750,723
[45] Aug. 7, 1973

[54] SINGLE POINT MOORING SYSTEM

[75] Inventor: Joseph F. Schirtzinger, Pasadena, Calif.

[73] Assignee: Air Logistics Corporation, Pasadena, Calif.

[22] Filed: Jan. 4, 1971

[21] Appl. No.: 103,700

[52] U.S. Cl............................ 141/388, 9/8, 61/46.5, 114/230, 137/236, 138/DIG. 2, 417/405
[51] Int. Cl............................................... B65b 3/04
[58] Field of Search ..................... 9/8 R, 8 P; 61/46, 61/46.5; 114/230; 137/236, 236 OS; 138/DIG. 2; 141/387, 388; 417/405

[56] References Cited
UNITED STATES PATENTS

| | | | |
|---|---|---|---|
| 3,002,534 | 10/1961 | Noland | 138/DIG. 2 UX |
| 3,016,928 | 1/1962 | Brandt | 417/405 UX |
| 3,311,132 | 3/1967 | McWilliams | 141/388 X |
| 3,311,142 | 3/1967 | Bergstrom | 141/388 |
| 3,409,055 | 11/1968 | Bily | 141/387 |
| 3,452,787 | 7/1969 | Bily | 141/388 |
| 3,465,374 | 9/1969 | Johnson et al. | 9/8 P |
| 3,466,680 | 9/1969 | Schirtzinger | 114/230 X |
| 3,572,408 | 3/1971 | Hnot | 141/387 |

Primary Examiner—Houston S. Bell, Jr.
Attorney—Christie, Parker & Hale

[57] ABSTRACT

A floating, rigid, tubular boom, pivotally connected to a submerged piling or buoy, provides self-contained mooring and fluid transport facilities for offshore servicing of cargo vessels in a downstream position.

21 Claims, 11 Drawing Figures

Fig. 1

Fig_2

Fig_3

SINGLE POINT MOORING SYSTEM

BACKGROUND OF THE INVENTION

The present invention relates to the mooring and servicing of cargo vessels offshore.

Ocean and sea-going cargo vessels have already reached the size where many ports are incapable of servicing them. In many instances, the port is too shallow or has berths too small to accommodate modern ships.

Even when a vessel can be docked at a shoreside facility, the transfer of cargo is still relatively expensive because it requires expensive docking facilities as well as means, such as tugboats, for guiding the vessel to the dock, as large vessels generally are incapable of docking under their own power. Aside from economical considerations, poor weather, such as stormy weather conditions, high waves, currents or tides, often make it impossible for a vessel to dock for extended periods of time. During a storm, for instance, a vessel might have to remain outside the dock or, if already docked, may have to remain at the dock until the storm subsides. During such times the vessel, as well as the dock, are unused and this results in economic waste.

To alleviate this problem, systems have been proposed for servicing ships offshore. One system employs multipoint mooring serviced by submarine pipelines, in which a ship is positioned between a series of mooring points anchored thereto. Service facilities are established using auxiliary means such as a tender, which brings and attaches flexible supply hoses to the vessel. Although vessels are able to dock at these facilities without the help of tugboats as long as favorable weather conditions prevail, heavy seas or high winds frequently make it impossible to dock. In addition, should heavy seas occur while the vessel is moored, the docking facilities might become damaged.

More recently, vessels have been anchored by means of a bow and a stern anchor and adjacent to a submarine pipeline which had attached thereto a flexible hose for transfer of fluids to or from the vessel. This system also requires the assistance of a tugboat or a launch in order to bring the flexible hose secured to the submarine pipeline to the vessel. Heavy winds and waves make this system unusable since it is then almost impossible for the tugboat to approach the vessel with the flexible hose. In addition, the wind and waves often move the vessel to such an extent that it breaks loose from the hose, thereby damaging the installation which requires expensive repair work.

To avoid some of the shortcomings encountered by anchoring the ship independently from the pipeline and the transfer hose, floating buoys have been utilized to which the vessel could be moored. These buoys are a junction point between a submarine pipeline leading from the shore to the buoy and have flexible floating hoses for servicing the vessel. This greatly enhances the utility of offshore loading and unloading since both the vessel and the hose running from the vessel to the buoy are secured to a common point, namely, the buoy. A number of problems, nevertheless, prevented full utilization of this relatively inexpensive method for loading and unloading of vessels.

The hose between the buoy and the ship has to be relatively long and it is frequently difficult for an approaching vessel to locate the end of the hose. As wave and wind action tend to float the hose over large areas, sometimes extending to as much as a mile in diameter, it is difficult and sometimes almost impossible for large vessels to retrieve the hose without the help of a launch or a tug. Further, the flexible hose can be easily cut by a ship and the buoy damaged by movement of the separately moored vessel relative to it.

SUMMARY OF THE INVENTION

According to the present invention there is provided a unitized single point mooring system for servicing cargo vessels offshore. The system comprises a rigid hollow boom pivotally connected at one end to a submerged fluid transport conduit and providing, at the opposed end thereof, mooring and servicing facilities for the vessel. In a preferred construction, the boom is substantially el shaped to provide bow, stern and midship servicing to a vessel and minimize the amount of the boom in the path of travel of a vessel. The boom, in addition, may be provided with a wave fairing that keeps the service boom downstream or downwind to accommodate the natural approach of a vessel.

DESCRIPTION

According to the present invention, there is provided a combined single point mooring and fluid transport system for servicing of cargo vessels.

Generally, the single point mooring system of this invention comprises a substantially hollow rigid boom containing a sufficient surrounding variable flotation to maintain mooring and fluid transport services affixed to one end thereof above the water level, and which can be pivotally connected at the opposed end thereof to a submerged piling or buoy which is, in turn, connected to portside fluid storage or handling facilities.

In a preferred construction, the boom is el shaped and provided with an impact resistant wave fairing to maintain the boom in a down current position and contains air-activated means to adjust the buoyancy of the boom to raise and lower thereby the end mounted mooring and service facilities to accommodate fluctuations in the height of the vessel.

FIGS. 1, 2, 3 and 4 illustrate the preferred construction and operation of the single point mooring system of this invention. With reference thereto, boom 10 comprises a substantially rigid el shaped tube 12 having one leg 14 disposed in a vertical direction and the other, 16, disposed in a substantially horizontal direction under the path of travel of a vessel. A portion of leg 16 is provided with an encased, elliptically shaped resilient flotation section 18 which surrounds the hollow fluid transport tube and which may contain ballast tubes 20 to adjust the buoyancy of the boom to raise and lower the service facilities mounted at the end of leg 14 to accommodate variations in the surfaced height of a vessel.

Figure 1:
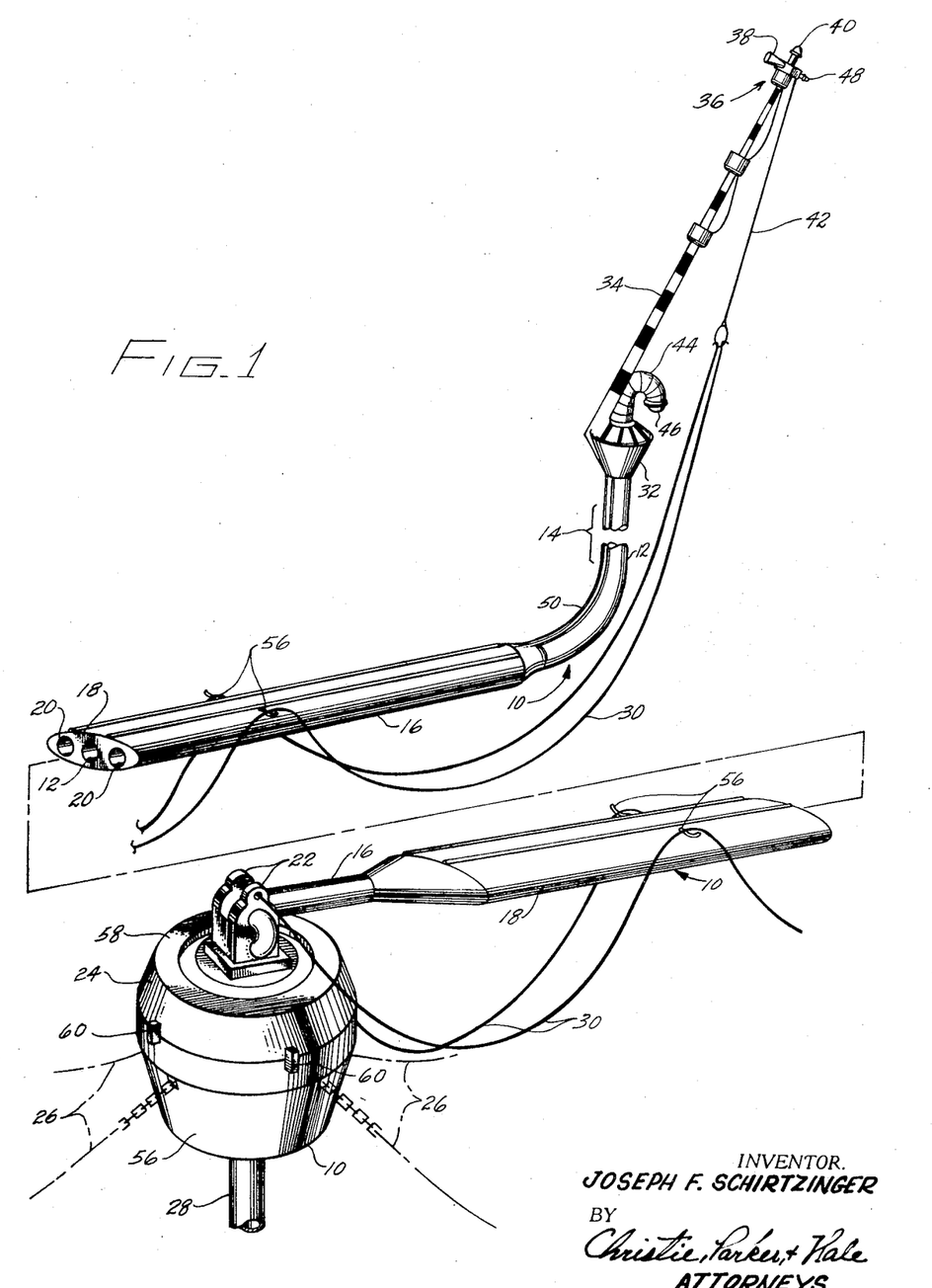
FIG. 1 is a detail illustration of the el shaped boom of this invention secured to a submerged buoy.

The opposed end of the boom is connected to swivel joint 22 which is in turn connected to a submerged piling or, as shown, a submerged buoy 24. The buoy is biased against anchoring chains 26 by self-contained flotation chambers. The buoy is, in turn, connected to a conduit 28 to shore facilities (not shown). Swivel joint 22 permits vertical and horizontal movement and, where the boom is el shaped, anchors mooring lines 30.

At the servicing end of leg 14, there is provided means to establish mooring and fluid transport communication with a sea-going vessel. While no wise limiting, the mooring means include flotation bumper collar 32, messenger pole 34, containing at the end thereof signalling means 36 which may include foghorn 38, beacon 40 and cable 42 which holds mooring lines 30 above the water level. There is also included flexible tube 44 having at the end thereof coupling 46 for establishing fluid transport communication with the vessel.

To maintain mooring and surface facilities above the water level, for ease in communication with a cargo vessel, boom 10 is provided with impact resistant flotation section 18 which is part of horizontal leg 16. This flotation section contains flotation material such as polystyrene, rigid urethane foam, structural vinyl foam, and the like in amounts sufficient to maintain mooring and service facilities above water under all weather conditions. The height at which the impact resistant flotation section 16 floats the mooring facilities is dependent upon the nature of the ships being serviced and the service provided. Generally, for use in servicing large vessels the mooring and service facilities should normally be buoyed to position the tip of messenger pole 34 about 63 feet vertically above the water level at mean-high water when a cargo vessel is normally loaded and about 23 feet above water level when the service boom is normally used for unloading a laden vessel.

It can be well understood, however, that these prescriptions are only suggested and may vary widely depending upon the service contemplated, as well as on the nature and size of vessel being serviced.

For a maximum flexibility there is also contained in flotation section 18, ballast tubes 20. When normally filled with water the mooring facilities are maintained at a desired level above the surface of the water. The end of messenger pole 34 is provided with coupling 48 and connected to air line 50 which communicates with the ballast tubes. When an approaching ship contacts messenger pole 34 air may be pumped into tubes 20 to displace water to increase, thereby, the buoyancy of boom 10 and raise boom 10 to a height sufficient to permit coupling of the boom to the vessel. In the alternative, the air or other gas provided for displacing water in ballast tubes 20 may be supplied from shore or from an air reservoir in buoy 24 as hereinafter explained.

Figures 2, 3:
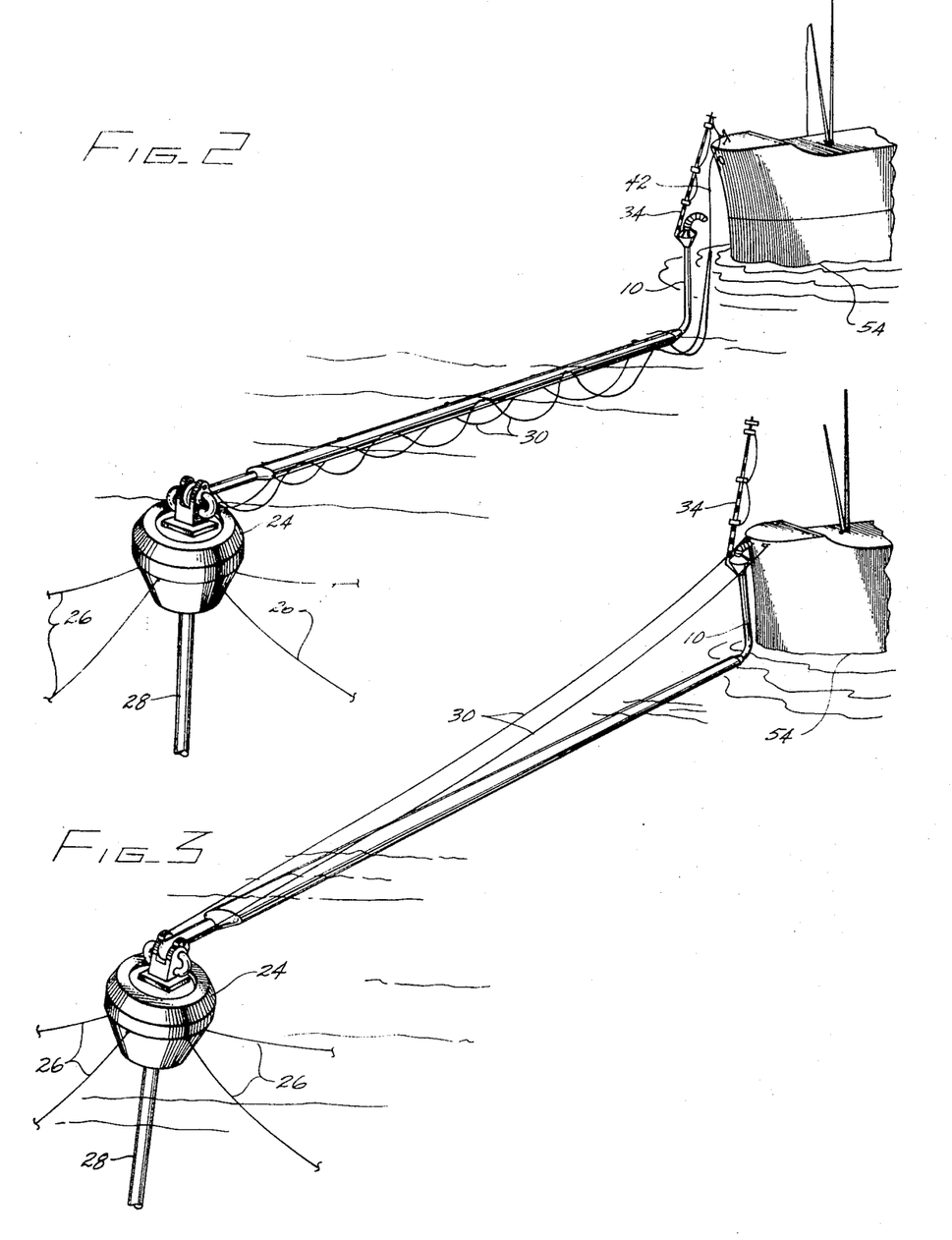
FIG. 2 illustrates the method of establishing contact with the boom of FIG. 1.
FIG. 3 illustrates the boom in servicing relation to the bow of the cargo vessel.
Figures 4, 5:
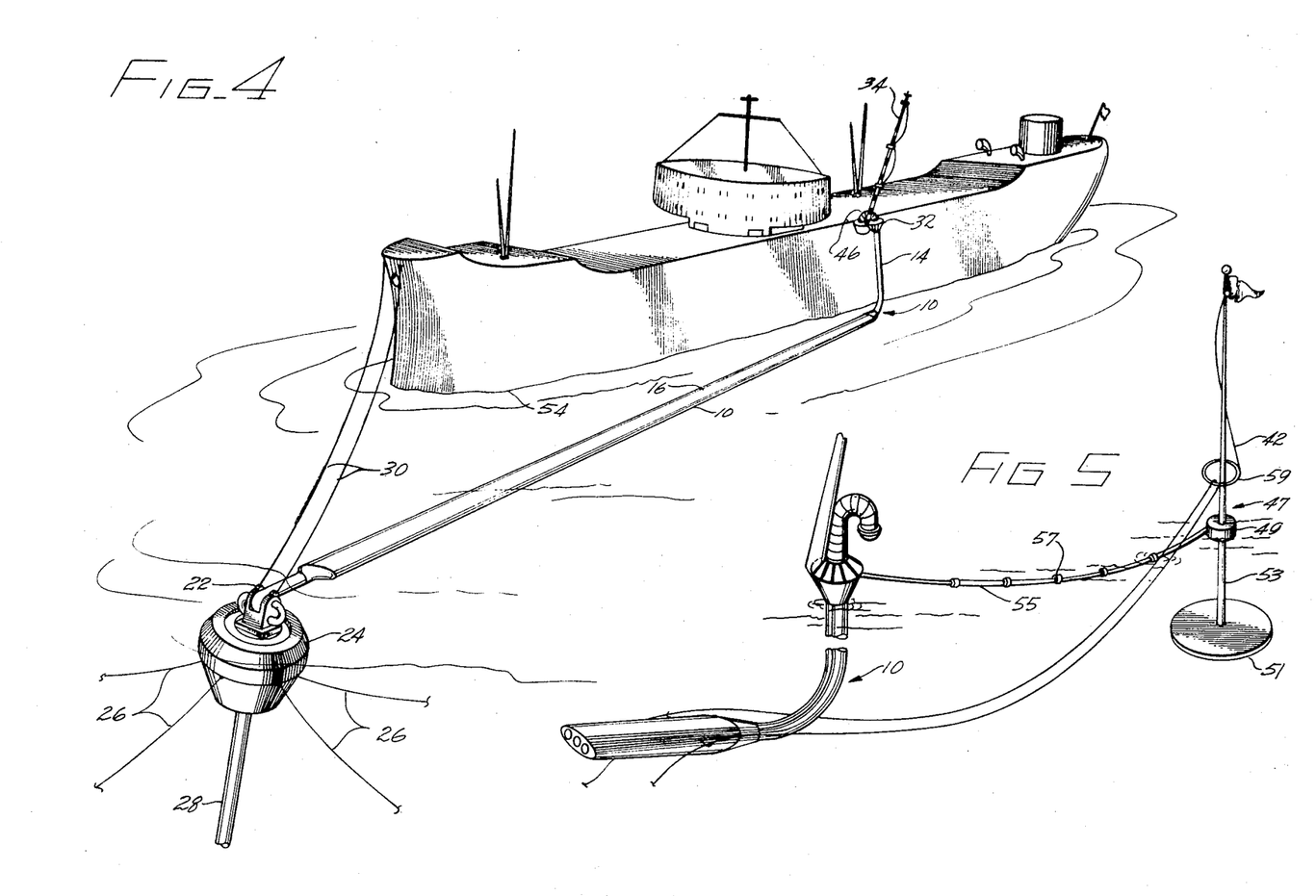
FIG. 4 illustrates the boom of FIG. 1 servicing the vessel amidship.
FIG. 5 illustrates an alternate means to providing the mooring lines to an oncoming vessel.

With reference now to FIGS. 2, 3 and 4, there is illustrated sequential operations which occur in mooring and establishing flow communication with a cargo vessel. With messenger pole 34 being maintained above the water level, by the floatation provided in boom 10 will tend to maintain a downcurrent or downwind position to accommodate the approach of a cargo vessel in a normal manner. Once the vessel 54 approaches boom 10, a member of the crew receives line 42 held above the water by messenger poles 34 and draws in mooring cables 30.

With reference to FIGS. 1 and 3, mooring lines 30 are initially supported along the length of leg 16 by hooks 56. When the mooring lines 30 are drawn to the vessel, the mooring lines are raised from hooks 56 and are returned to their original position when the lines are released. With mooring lines 30 secured to the vessel, air flow may be established through nozzle 48 in messenger pole 34 and air introduced to displace water in ballast tubes 20 contained in flotation section 18 and the boom raised in order to couple with, as illustrated in FIG. 3, the forward fluid transport couplings of vessel 54.

As cargo vessel 54 is unloaded or loaded, boom 10 will either rise or sink with a change in displacement of the vessel.

Where, as shown in FIG. 4, loading amidships is required, mooring lines 30 will be drawn into the vessel 54 by a suitable winch and boom 10 will be drawn along the side of the vessel and raised by flotation to establish float communication with amidship fluid transport port.

Again, once servicing of the vessel is complete, boom 10 will be released and mooring lines 30 let out and recoupled to holding line 42 prior to the vessel 44 disengaging the servicing boom.

In the alternative, where the cargo vessel is provided with a hoist, the boom, instead of being raised by increase in buoyancy, may be lifted aboard the vessel, at the bow, the stern, or amidships. This, however, can be conveniently accomplished without the use of attending tugs, or the like, since the boom will also, as indicated, tend to maintain a downcurrent position.

Although the boom may be of any dimension suitable for the application intended, for most sea-going operations it is desirable to maintain leg 16 of boom 10, when at rest, at a submerged level which will avoid contact with laden cargo vessels. This, in general, will require buoy 22 to be positioned approximately 70 feet below the water surface at mean-low tide for the geometry of vessel construction to meet most conditions. The length of leg 16 will be approximately 400 feet, while the length of leg 14 will be approximately 65 to 70 feet. As indicated, messenger pole 34 will be of sufficient length in order to establish ready communication with a vessel which is either laden or unladen, depending upon the nature of the service provided.

Submerged buoy 24 may be generally of a construction as provided by U.S. Pat. No. 3,466,680, incorporated herein by reference with exception that the surfaced signalling device is eliminated due to the buoy's depth.

As described in the aforementioned patent, buoy 24 may be constructed of two units, an outer annular buoy 56 and inner buoy 58. Unit 56 is provided with sufficient flotation to maintain some bias against cables 26 and an inner unit 58 contains an air cell (not shown) to provide additional buoyancy in order that buoy 24 will remain biased against cables 26 when boom 10 is in its released position. The annular portion of buoy 56 is secured to center buoy signal by inner locking clips 60 which release upon a sibnal and allow buoy section 58 to float to the surface for its servicing when required. It carries with it conduit 28 which remains connected to shore facilities.

When servicing of surfaced portion of buoy 24 is complete, the chamber contained within the buoy is allowed to fill with water. This causes the buoy 58 to sink and recouple with an annular shaped buoy 56 and latch 60 is closed. The water is then displaced by air which provides the buoyancy to bias buoy 24 against retaining lines 26.

An alternate means for providing mooring lines to an oncoming vessel is illustrated in FIG. 5. With reference thereto, a tilting buoy 47 comprising a free floating buoy 49, a submerged disc 51 having a relatively large diameter such that the hull of a vessel, particularly, the relatively straight sidewalls of ocean going tankers, can engage the periphery of the disc, and an upright mast 53, is positioned some distance away from boom 10. The upright mast is secured to buoy 49 and can be tilted in any desired direction. The mast is of a length sufficient to extend above the level of the deck of an approaching vessel and may contain signaling indicia. A semi-flexible rod 55, preferably also constructed from "Stratoglas" and preferably provided with floats 57 to maintain it at the surface of the water, connects the tilting buoy 47 to boom 10. One end of a messenger line 42 is secured to ring 59 which is disposed around the upright mast. Ship personnel can then grasp the messenger line and draw it towards them moving the ring in an upward direction. The ends of the mooring lines 30 are held to ring 59 by hooks.

When vessel 54 approaches the tilting buoy 47, it generally approaches the space between the boom and the buoy. The bow of the vessel engages thereby, flexible rod 55 whereby buoy 47 is pulled toward the vessel until the hull of the vessel contacts disc 51. This tilts the buoy sideways towards the vessel. As the vessel continues this movement, its hull contacts and slides along the mast. A crew member grasps messenger line 42 and pulls the ring with the attached mooring lines to the ship's deck. The mooring lines are then detached from the ring and secured to the vessel. Mast 53 is also secured to the vessel. The boom is then lifted to its servicing position in the manner described above.

The use of an outboard mooring system as depicted in FIG. 5 and described above is of particular advantage under heavy sea conditions as it permits the vessel to establish mooring prior to actual contact with the boom. This prevents the possibilities of damaging contacts with the boom which might occur as a consequence of a sudden sea surge. If any apparatus is damaged it would be the tilting buoy which is relatively low in cost as compared to the boom.

Figure 6:
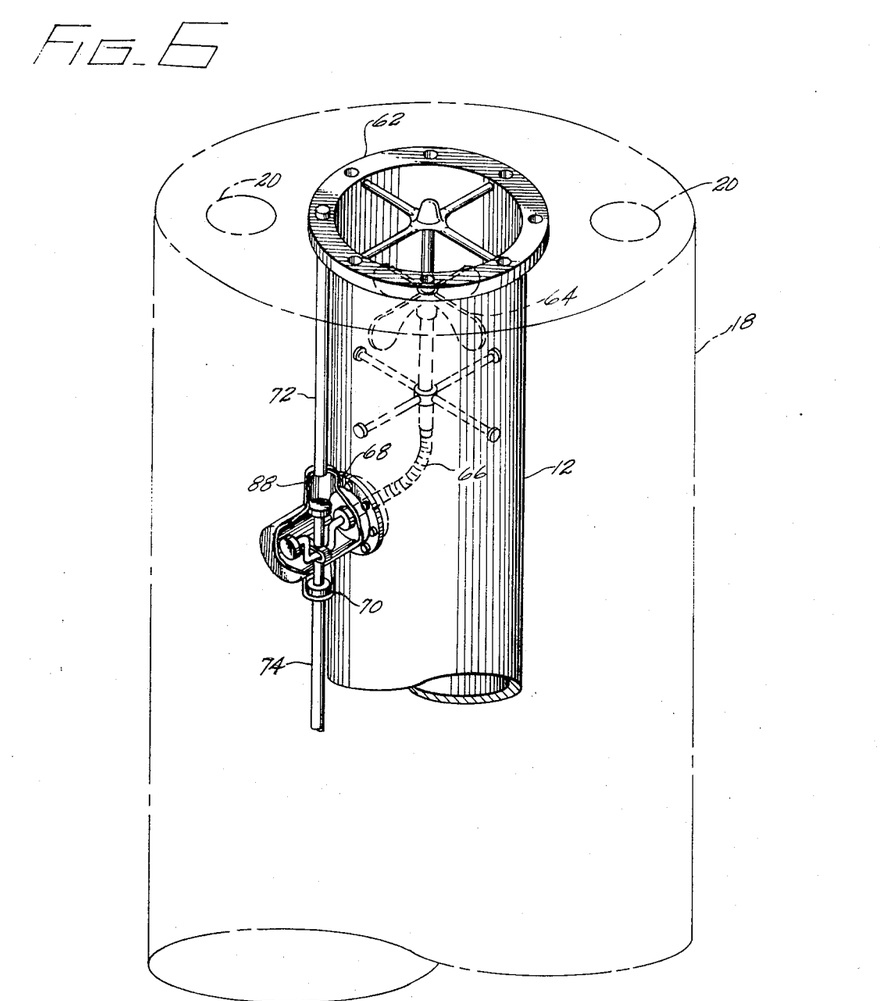
FIG. 6 illustrates a system for compressing air for maintaining boom and/or buoy buoyancy.

As indicated, section 58 may serve as air reservoir for modifying buoyancy of boom 10 by adjusting the air content of ballast tubes 20. For such operations there may be included, within the body of boom 10, compressor 62 as illustratd in FIG. 6. With reference thereto, there may be included within the structure of the rigid fluid transport, tube 12 of boom 10, an impeller 64 which is driven by the flow of fluids during unloading or loading a vessel which, in turn, drives shaft 66 which operates the reciprocating pump 68, having cylinders 70 draw air during rotation through line 72 from the surface and compress it into line 74 which is connected to the chamber within buoy 58. The air contained in the chamber may be released by a suitable signal and allowed to fill ballast tubes 20 and displace therefrom water to increase the buoyancy of boom 10.

Figure 6A:
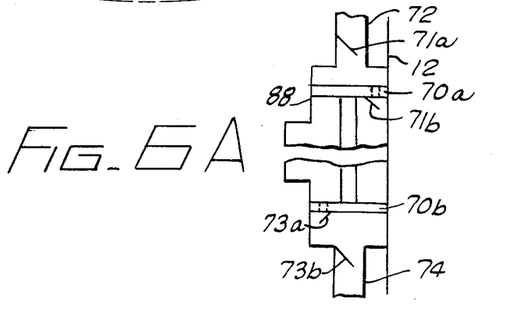
FIG. 6A illustrates one valve arrangement for compressing air for maintaining boom and/or buoy buoyancy.

FIG. 6A illustrates one valve arrangement useful in maintaining a flow of compressed air from line 72 to line 74. When piston 70a is driven in a downward position, flap valve 71a in line 72 opens and 71b closes admitting air to the cylinder. When the reverse mode occurs flap valve 71a closes and flap valve 71b opens to allow the air to pass from the cylinder into the chamber. When piston 70b is in a downward stroke, flap valve 73a closes and 73b opens admitting compressed air into line 74. On an upstroke, valve 73b closes and flap valve 73a opens to admit air from the chamber into the cylinder.

As will be appreciated, the compressor system will be operated each time a vessel is serviced to store the air required for providing buoyancy to the boom when a subsequent vessel is connected or serviced.

Figures 7, 8, 10:
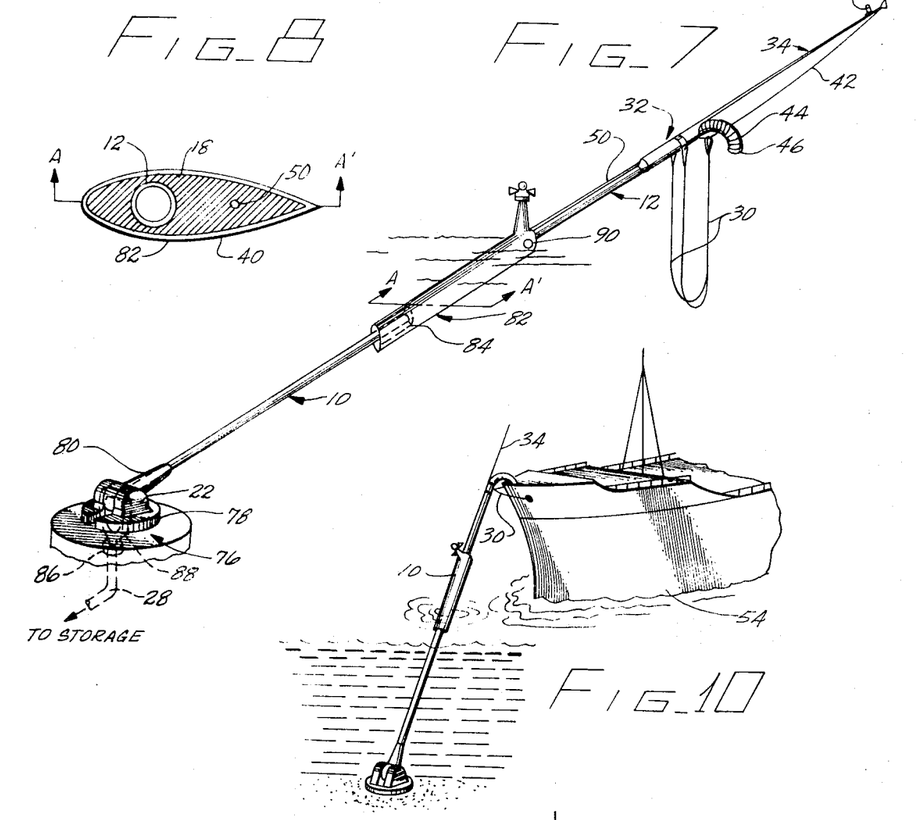
FIG. 7 illustrates an alternate single point mooring system containing the service boom of this invention.
FIG. 8 is a cross-sectional cut taken at A-A' to illustrate the streamline flotation system which may be used to maintain mooring and service facilities above water and in a down current position.
FIG. 10 is an animation of the same cargo vessel after unloading.

Although boom 10 has been shown affixed to a submerged buoy, where the water is reasonably shallow, it may be affixed to a submerged piling which will be illustrated in greater detail in FIG. 7. The center of the piling may, moreover, be comparable to the releasable section 58 of buoy 24 in order that the boom may be raised for servicing when required. Section 58 may also serve the same functions it served as part of buoy 24, namely, to act as a reservoir for air in servicing the ballast tubes of boom 10.

While the single point mooring system of this invention has been described thus far as having an el shaped boom, it may also have a straight boom such as the boom illustrated in FIG. 7.

With reference thereto, the single point mooring service system containing the novel mooring rigid boom 10 is substantially hollow and linear in configuration. The lower end of boom 10 is shown pivotally connected to a swivel joint 22, which is, in turn, secured to a submerged anchorage piling 76 and provides horizontal and vertical movement to the boom. Although no wise limiting, the swivel joint as shown may conveniently be one having a horizontally rotatable, load bearing turntable 78 and a vertically rotatable, load bearing joint connecting the turntable 78 to the submerged end of the boom 10.

At the opposed end of the boom is provided the means to moor and establish fluid transport communication with a sea-going vessel, identified above. In this construction, however, ship signalling devices are located on wave fairing 82.

The surfaced end of the boom is further provided with the means 44 and 46 to establish fluid transport communication with the fluid storage compartments of the cargo vessel to permit the transport of fluids, such as fluidized solids, liquids and gases, to or from the cargo vessel through boom 10, which is, in turn, in connecting communication with a submarine conduit 28 generally running to shoreside or underwater storage vessels (not shown).

To maintain mooring and service facilities above water for ease in establishing communications with a cargo vessel, the hollow boom is provided an impact-resistant wave fairing 82 which contains sufficient flotation material to maintain mooring signalling and service facilities above water under all weather conditions. Flotation by means of the impact-resistant wave fairing may also be achieved by providing a sealed chamber filled with a gas, such as air.

The height at which the impact-resistant wave fairing 34 floats the mooring and service facilities is again dependent upon the nature of the ships being serviced and the service provided with the prescription set forth above being generally followed.

With reference now to FIG. 8, which shows cross-sectional cut along a plane approximately corresponding to mean average water level, the impact-resistant wave fairing 82 is hydrodynamically profiled to cause the boom to swing with changes in current so as to always provide a downstream mooring situs for a cargo vessel. This is typically accomplished by means of the profile shown in FIG. 8 in which the hollow tube 12 is positioned off-center in flotation section 14.

In addition to providing minimum flotation for the boom, the impact-resistant wave fairing also preferably contains a hollow zone 84 which is open below the water line and in connectable communication with a pressurized gas supply which may be used to displace water so as to provide additional regulative buoyant forces as an aid in positioning the boom with respect to the vessel being serviced. This may be conveniently accomplished by the use of pressure nozzle 48 at the end of the messenger pole 34, as shown, or attached to bumper 32, and connected to chamber 84 by air conduit 50.

For this given arrangement, an approaching ship can connect an air line to nozzle 48 and pump air into chamber 84 through line 50 to raise the boom above the ship, then by releasing part of the buoyant air allow the boom to drop slightly to establish connection with the ship's cargo-loading facilities.

In the alternative, air may be supplied to chamber 84 from shore through a submarine air supply line or an air chamber (not shown) below swivel joint 22, the air being supplied to the chamber from shore or by compressor 62.

Fluid transport communication through swivel joint 22 on buoy 24 or piling 76 is achieved through water-tight fluid coupling. The coupling shown typically comprises a horizontally rotatable Y-shaped conduit 86 mated with a water-tight vertically rotatable conduit 88 in joint 22, which is, in turn, connected to the hollow boom 10. The seals used may be typically O-ring seals as the fluid supply portion of the swivel base 12 is not load bearing, since the joint 22 has independent load bearing means, such as ball and roller bearings.

When the boom is straight, it may be used to resist the tensional forces created by the moored vessel as well as the pressures applied in pumping fluid either from or to the vessel. While many materials of construction may be used, fiberglass reinforced resins, particularly fiberglass reinforced epoxy resins such as Stratoglas, a parallel glass fiber reinforced resin, are preferred, as they provide maximum strength to weight ratios and offer excellent resistance to corrosion.

The cross-sectional configuration of the hollow tube 12 is not narrowly critical and may be round, oval, square, triangular or rectangular in nature, although, as is well understood in the art, oval or round configurations provide maximum strength and are much easier to fabricate.

The length of the straight boom must be sufficient to extend beyond the surface of the water at maximum tide levels and to maintain communication with an empty or cargo-light vessel without arcing to the vertical. Generally, it is desired to limit the maximum arc to about 60° from horizontal at maximum tide levels.

It is also desirable to provide a secondary, quick disconnect coupling 90 for connection to floating hose used in midship loading of some vessels. This quick disconnect can be used for the loading of older vessels only having midship loading facilities or for the simultaneous loading of ships equipped with both front and side loading facilities. The quick disconnect is preferably of the automatic closing variety which will instantly seal when a connecting hose is disconnected therefrom.

Figure 9:
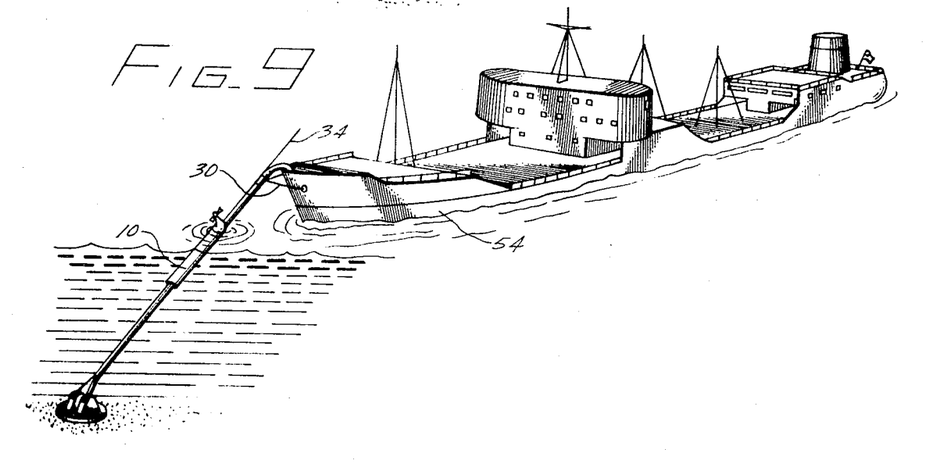
FIG. 9 is an animation of a loaded cargo vessel being serviced with the single point mooring boom of FIG. 7.

With reference now to FIGS. 9 and 10, the functional operation of the straight single point mooring boom, may, for example, be described in terms of the unloading of an ocean-going vessel. The boom, because of the hydrodynamic configuration of the wave fairing, will normally lie in a downcurrent position. As with an el shaped boom, a cargo vessel on approach will first establish communication with the messenger pole 34. The mooring lines 30 are drawn up, disconnected from messenger line 42 and the vessel moored. Flexible hose section 44 is then connected to the discharge port from the vessel and the contents pumped through the boom to shore or underwater storage vessels. If the boom is not naturally positioned relative to the ship, it may, as indicated, be lifted using a hoist for proper positioning, or air can be pumped into chamber 44 to raise the boom by water displacement for proper positioning relative to the ship. Once proper connection has been made, the boom serves to moor the ship during the unloading operation while allowing the ship to freely swing with the tide or wind.

With reference now to FIG. 10, as the ship empties it rises. The boom rotates upwards with it and once the ship is empty, the boom is disconnected, the mooring lines reattached to messenger line 42, the boom allowed to drop free of the ship and settle to its normal rest position with the release of air pressure from chamber 84.

Because the boom will help maintain the ship in the downcurrent position and is angled with respect to the ship, the ship may safely depart from the boom without fear of damaging the boom under all weather conditions. While the flotation section of the el shaped boom will permit the boom to rotate with tides and currents, when tides are weak, the wave fairing 82 may be provided on the vertical leg 14 to increase the turning moment of the boom to assure downcurrent or downwind position.

While no wise limiting, an example of general dimensions and properties which can be established for a single point mooring system of this invention through the use of fiberglas construction, there may be obtained, using a circular hollow boom of 32 inches inside diameter and having a wall thickness of from one-half to 1 inch, a mooring system having a general flexural modulus in the order of about $4 \times 10^6$ psi, flexural strength of 140,000 psi, and capable of loading or unloading a vessel at fluid operating pressures up to about 800 psi.

What is claimed is:

1. A structure for use in offshore mooring and servicing of seagoing vessels which comprises:
   a. a unitary, self supporting, substantially hollow, rigid fluid transporting boom adapted to be connected to one end thereof to a submerged point of communication with a submarine fluid transport conduit and to extend therefrom above the water surface;
   b. means for mooring and establishing fluid transport communication with the seagoing vessel at the opposed end of said boom; and
   c. flotation means connected to and surrounding said boom along a portion of the length thereof, said flotation means containing means to vary the buoyancy of said boom and to maintain said means for mooring and fluid transport communication above the water surface.

2. The structure as claimed in claim 1 in combination with an impact-resistant wave fairing connected to said boom, said wave fairing adapted to intersect the water surface when said boom is at rest.

3. A structure as claimed in claim 2 in which the wave fairing contains said flotation means.

4. A structure as claimed in claim 3 in which impact-resistant wave fairing is provided with means to vary the buoyancy of the boom.

5. A structure as claimed in claim 4 in which the means to vary the buoyancy of the boom comprises a normally submerged chamber in open communication with water and in connectable communication with the pressurized gas supply.

6. A structure as claimed in claim 1 in which the boom is el shaped having:
   a. a normally submerged horizontal leg adapted to be connected to a submerged point with the submarine fluid transport conduit and containing the means of flotation; and
   b. a vertically extending leg adapted to extend to at least the water surface and connected to the means for mooring and establishing fluid transport communication with a seagoing vessel.

7. A structure as claimed in claim 6 in which the means to vary the buoyancy of the boom comprises at least one horizontally extending ballast tube in connectable communication with a pressurized gas supply.

8. Apparatus as claimed in claim 6 in which the means to vary the buoyancy of the boom is connected to an air chamber contained by the submerged point of communication.

9. Apparatus as claimed in claim 8 in which the air chamber is connected to a compressor system comprising:
   a. means to compress air located in the flotation means; and
   b. an impeller inserted in the boom, said impeller adapted to be driven by a flow of fluid through said boom and shaft means connecting said impeller to said compressor means.

10. A structure as claimed in claim 1 in which the boom is constructed from a glass fiber reinforced resin.

11. A structure as claimed in claim 1 in which the means for mooring and establishing communication with a seagoing vessel includes means to signal an approaching vessel.

12. A structure as claimed in claim 1 in which the boom is tubular.

13. A single point mooring system for offshore surfacing of seagoing vessels which comprises:
   a. an anchored coupling in connecting communication with a submarine fluid transport conduit;
   b. a unitary, self supporting, substantially hollow, rigid, fluid transporting boom pivotally connected at one end thereof to said coupling and in open watertight communication with said submarine conduit, said boom adapted to extend from said coupling to at least the water surface;
   c. means for mooring and establishing fluid transport communication with a vessel at opposed end of said boom; and
   d. flotation means connected to and surrounding at least a portion of said boom, said flotation means containing means to vary the buoyancy of said boom and to maintain said means for mooring and establishing fluid transport with the vessel above the water surface.

14. A single point mooring system as claimed in claim 13 in which the coupling is secured to a submerged buoy.

15. A single point mooring system as claimed in claim 13 in which the coupling is secured to a submerged piling.

16. The single point mooring system as claimed in claim 13 in combination with an impact-resistant wave fairing connected to said boom, said wave fairing adapted to intersect the water surface when said boom is at rest.

17. A single point mooring system as claimed in claim 16 in which impact-resistant wave fairing is provided with means to vary the buoyancy of the boom, said means comprises a normally submerged chamber in open communication with water and in connectable communication with the pressurized gas supply.

18. A structure as claimed in claim 13 in which the boom is el shaped having:
   a. a normally submerged horizontal leg connected to the anchored coupling and containing the means of flotation; and
   b. a vertically extending leg adapted to extend to at least the water surface and connected to the means for mooring and establishing fluid transport communication with a seagoing vessel.

19. A single point mooring system as claimed in claim 18 in which the means to vary the buoyancy of the boom comprises at least one horizontally extending ballast tube in connectable communication with a pressurized gas supply.

20. A single point mooring system as claimed in claim 18 in which the means to vary the buoyancy of the boom is connected to an air chamber contained by the anchored coupling.

21. A single point mooring system as claimed in claim 20 in which the air chamber is connected to a compressor system comprising:
   a. means to compress air located in the flotation means; and
   b. an impeller inserted in said boom said impeller adapted to be driven by a flow of fluid through said boom and shaft means connecting said impeller to said compressor means.

* * * * *